US010419501B2

(12) United States Patent
Shrivastava et al.

(10) Patent No.: US 10,419,501 B2
(45) Date of Patent: Sep. 17, 2019

(54) DATA STREAMING UNIT AND METHOD FOR OPERATING THE DATA STREAMING UNIT

(71) Applicant: Futurewei Technologies, Inc., Plano, TX (US)

(72) Inventors: Ashish Rai Shrivastava, Plano, TX (US); Alan Gatherer, Richardson, TX (US); Sushma Wokhlu, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 539 days.

(21) Appl. No.: 14/958,773

(22) Filed: Dec. 3, 2015

(65) Prior Publication Data

US 2017/0163698 A1   Jun. 8, 2017

(51) Int. Cl.
*G06F 15/16* (2006.01)
*H04L 29/06* (2006.01)
*G06F 12/00* (2006.01)
*G06F 15/76* (2006.01)
*G06F 9/38* (2018.01)

(52) U.S. Cl.
CPC ........ *H04L 65/4069* (2013.01); *G06F 9/3824* (2013.01); *G06F 12/00* (2013.01); *G06F 15/76* (2013.01)

(58) Field of Classification Search
CPC ..... H04L 65/4069; G06F 9/00; G06F 9/3824; G06F 12/00; G06F 15/76
USPC .......................................................... 709/219
See application file for complete search history.

(56) References Cited

U.S. PATENT DOCUMENTS

| 5,717,947 A * | 2/1998 | Gallup .................... G06F 7/544 712/22 |
| 2011/0093648 A1* | 4/2011 | Belluomini ......... G06F 12/0868 711/103 |
| 2014/0237010 A1* | 8/2014 | Ge .......................... G06F 17/16 708/204 |
| 2017/0153890 A1* | 6/2017 | Anderson ............. G06F 9/3016 |

FOREIGN PATENT DOCUMENTS

| CN | 102354304 A | 2/2012 |
| CN | 104202054 A | 12/2014 |
| CN | 104753830 A | 7/2015 |

\* cited by examiner

*Primary Examiner* — Frantz B Jean
(74) *Attorney, Agent, or Firm* — Slater Matsil, LLP

(57) ABSTRACT

A data streaming unit (DSU) and a method for operating a DSU are disclosed. In an embodiment the DSU includes a memory interface configured to be connected to a storage unit, a compute engine interface configured to be connected to a compute engine (CE) and an address generator configured to manage address data representing address locations in the storage unit. The data streaming unit further includes a data organization unit configured to access data in the storage unit and to reorganize the data to be forwarded to the compute engine, wherein the memory interface is communicatively connected to the address generator and the data organization unit, wherein the address generator is communicatively connected to the data organization unit, and wherein the data organization unit is communicatively connected to the compute engine interface.

21 Claims, 8 Drawing Sheets

DATA STREAMING UNIT AND METHOD FOR OPERATING THE DATA STREAMING UNIT

TECHNICAL FIELD

The present invention relates generally to a data streaming unit and method for operating a data streaming unit, and, in particular embodiments, to a wireless baseband system and method for operating a wireless baseband system.

BACKGROUND

Conventional wireless baseband system includes a digital signal processor (DSP), a standard non-uniform access architecture (NUMA) or cache and a storage (on-chip memory or off-chip DDR memory). The data stored in the Storage (on-chip memory or off-chip DDR memory) is typically accessed by the DSP via the NUMA or cache.

SUMMARY

In accordance with an embodiment of the present invention a data streaming unit (DSU) includes a memory interface configured to be connected to a storage unit, a compute engine interface configured to be connected to a compute engine (CE) and an address generator configured to manage address data representing address locations in the storage unit. The data streaming unit further includes a data organization unit configured to access data in the storage unit and to reorganize the data to be forwarded to the compute engine, wherein the memory interface is communicatively connected to the address generator and the data organization unit, wherein the address generator is communicatively connected to the data organization unit, and wherein the data organization unit is communicatively connected to the compute engine interface.

In accordance with an embodiment of the present invention a method for providing data from a storage unit to a compute engine (CE) via a data streaming unit (DSU) includes receiving, by the DSU, data from the storage unit, reorganizing, by the DSU, the data from a first format to a second format and temporarily storing, by the DSU, the data having the second format at DSU holding registers.

In accordance with an embodiment of the present invention a system comprises a compute engine (CE) configured to process baseband data, a storage unit configured to store baseband data, a cache communicatively connected to the compute engine and the storage unit and a data streaming unit (DSU) configured to provide the baseband data either from the storage unit to the compute engine or vice versa by bypassing the cache, wherein the data streaming unit is communicatively connected to the storage unit and the compute engine.

In accordance with an embodiment of the present invention a method for operating a baseband system comprises accessing first data, by the data streaming unit, from a storage unit, rearranging the first data, by the data streaming unit, from a first format to a second format, wherein the second format comprises a vector format and mapping or popping the first data with the second format, by a compute engine, from DSU holding registers to vector registers in the compute engine. The method further comprises processing, by the compute engine, the rearranged first data in a first iteration and storing, by the compute engine, the processed first data in the storage unit, wherein the compute engine, the data streaming unit, and the storing unit are separate hardware devices.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Conventional wireless processing system access stored data via a standardized non-uniform memory access (NUMA) architecture. Wireless baseband data access patterns are not sequential but are instead heavily strided accessing multiple memory locations (such as m memory locations). In the majority of cases the m different memory locations are greater than the n processing paths of the data caches and the stride offset between those m different locations are more than the size allocated for each data path in the data cache. This causes significant conflict cache misses in almost every iteration and results in inefficient usage of valuable DSP resources. Moreover, DSP resources are used to generate address data and reorganize the data into vector form. Accordingly, precious processing cycles are wasted for getting data closer to the DSP.

Embodiments of the invention accelerate data access of the compute engine (CE) and reduce the stalls of the NUMA architecture. Further embodiments of the invention provide that the computer engine such as a digital signal processor (DSP) performs data processing rather than calculating addresses or indexes and then waits for the data arriving from storage unit (e.g., on-chip any memory and off-chip DDR memory). Yet in some embodiments the system offloads address calculation and data conversion (such as rearranging the data into vector form) form the compute engine to the DSU. In further embodiments the DSU bypasses the NUMA architecture (in particular the cache) in providing data from the storage unit to the compute engine and vice versa.

Figure 1A:
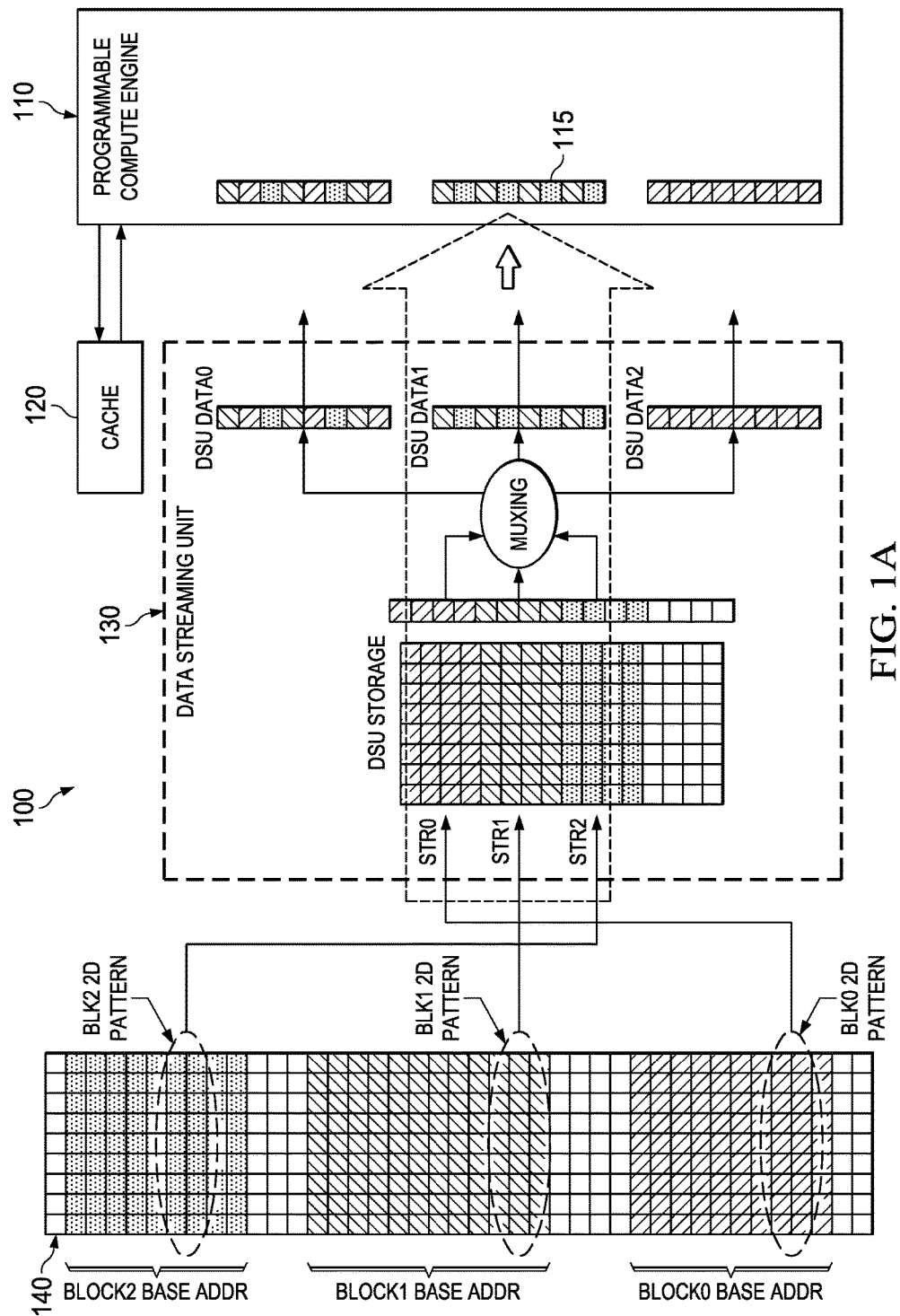
FIG. 1A shows a wireless baseband system configured to provide data from a storage unit to a compute engine (CE) via a data streaming unit (DSU) according to an embodiment.

FIG. 1A shows a wireless baseband system configured to provide data from a storage unit to a compute engine (CE) via a data streaming unit (DSU) according to an embodiment. The wireless baseband system 100 comprises a computer engine (CE) 110. The computer engine 110 may be a digital signal processor (DSP). The DSP may be a very long instruction word (VLIW) DSP. The CE 110 is configured to process signals such as baseband signals and control signals. Alternatively, the CE 110 may be any other processor. In some embodiments the CE 110 comprises vector registers 115 configured to directly receive data from the data streaming unit 130.

The wireless baseband system 100 further comprises a cache 120, a data streaming unit (DSU) 130 and storage unit 140. The cache 120 is communicatively connected to the CE 110 and communicatively connected to the storage unit 140. The DSU 130 is communicatively connected to the CE 110 and communicatively connected to the storage unit 140. The DSU 130 may not be directly communicatively connected to and a separate entity than the cache 120.

The cache 120 may be a smaller, faster memory than the storage unit 140. The cache 120 stores copies of data from frequently used storage locations. Most CEs 110 have different independent caches, including instruction and data caches. The data cache may be organized as a single level cache (e.g., L1) or a multi-level cache (e.g., L1, L2, etc.). The cache 120 may comprise volatile storage devices such as SRAMs or DRAMs. The cache 120 is configured to receive data requests from the CE 110 and provide the data to the CE 110

The storage unit 140 may comprise volatile memory or non-volatile memory. The storage unit 140 may comprise only volatile memories such as DRAMs. Alternatively, the storage unit may comprise only non-volatile memories such as PCRAMs, MRAMs (e.g., STT-MRAM) or ReRAMs. The non-volatile memory may be flash memory array. In some embodiments, the storage unit 140 may comprise a hard disc or a solid state memory. In various embodiments, the storage unit 140 may comprise a combination of volatile or non-volatile memories. In some embodiments data are stored in the storage unit 140 wherein the data comes from different antennas. The data coming from these different antennas may be stored in chunks in different locations. The stored data may be baseband data.

The DSU 130 may be a device separate from the CE 110 (e.g., separate chip). The DSU 130 is configured to receive instructions from the CE 110 and provide data from the storage unit 140 to the CE 110. The DSU 130 may bypass the cache 120. The DSU 130 is further configured to calculate or generate address data of data locations in the storage unit 140. For example, the DSU 130 may manage data pointers pointing to data blocks in the storage unit 140.

The system 100 may be a system on chip (SoC), an integrated circuit (IC). The SoC may comprise the compute engine 110, the cache 120 and the DSU 130. The SoC may also include parts or all of the storage unit 140. For example, the storage unit 140 may comprise an on-chip memory and off-chip memory (e.g., a separate chip) such as a DDR4 memory. In other embodiments the compute engine 110 and the cache 120 may be a separate chip, the DSU 130 may be a separate chip and the storage unit may be a separate chip. In some embodiments the DSU 130 may be a processor, a microcontroller or a programmable logic device (PLD) such as an FPGA.

In some embodiments the wireless baseband system 100 is incorporated in a base station such as an eNB.

In some embodiments the wireless baseband system 100 offloads the address generation and address calculation operation from the CE 110 to the DSU 130. For example, the CE 110 outsources calculating of address locations for receiving (e.g., reading) of the (baseband) data to the DSU 130. However, in various embodiments, the CE 110 may not outsource submitting or storing (e.g., writing of) the calculated (baseband) data to the storage unit 140. This may be done in the traditional way via the cache 120 and not via the DSU 130.

In some embodiments the wireless baseband system 100 offloads the data reorganization into vector form from the CE 110 to the DSU 130. The DSU 130 may organize the data in algorithm specific vector form such as for single instruction multiple data (SIMD) vectors.

In various embodiments the wireless baseband system 100 bypasses the cache 120 and in particular the data cache via the DSU 130 to bring the data form the storage unit 140 to the CE 110. The DSU 130 may bypass the cache 120 only for processing data such as real time data but not for processing data for controlling the wireless baseband system 100. The wireless baseband system 100 may still use the cache 120 to read control data from (or write control data to) a location in storage unit 140 by first checking whether copies of these data are in the cache 120. If so, the CE 110 immediately reads from the cache 120, which is much faster than reading from the storage unit 140.

In some embodiments the DSU 130 and not the CE 110 may perform the scalar part of the wireless baseband vector signal processing algorithm such as address pointer management and data reorganization to form single instruction multiple data (SIMD) vectors. This has the advantage that the CE 110 can focus on performing signal processing and does not waste valuable resources for other activities such as peripheral activities. This has a further advantage that the program code of the CE 110 may be simplified and does not need to manage address pointers and data organization.

In further embodiments the DSU 130 may bring the stored data directly from the storage unit 140 to the CE 110. This has the advantage that the NUMA architecture is bypassed. NUMA architecture issues and latencies are avoided. For example, conflict cache misses are avoided. The DSU 130 may bring data from multiple configurable numbers of address pointers to cover a wide variety of data access patterns in wireless baseband systems. Finally, the DSU 130 advantageous provides an efficient power management for the CE 110 because the CE 110 can be powered down early compared to getting stalled due to a NUMA architecture related latency issue.

Figure 1B:
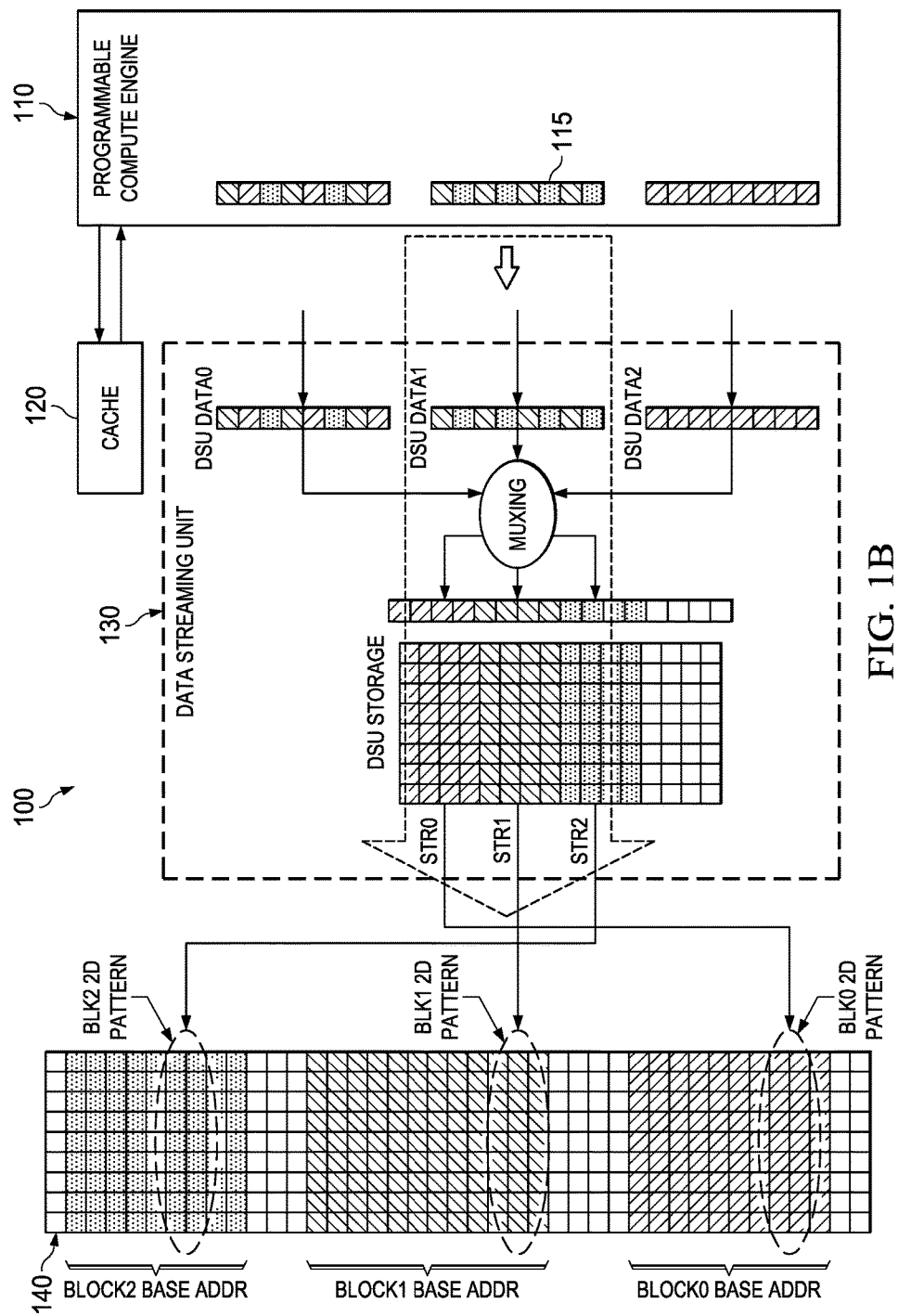
FIG. 1B shows a wireless baseband system configured to provide data from a CE to a storage unit via a DSU according to an embodiment.

Alternatively, in yet other embodiments and shown in FIG. 1B, the wireless baseband system 100 may outsource the address calculation and address generation to the DSU 130. The system 100 may be configured to write data from the CE 110 to the storage unit 140 via the DSU 130. This can be done in addition to writing data via cache 120 or completely separately, without using the cache L1 (the cache may not even be used for streaming data). The DSU 130 may arrange data to convert isolated stores into burst stores and therefore optimizes memory store operations. The DSU 130 may have a direct interface to the CE 110 via vector registers.

Returning now to FIG. 1A, the DSU 130 may copy data blocks from different address locations in the storage unit 140 to a DSU storage unit 139 (in FIG. 2A) in the DSU 130. For example, the DSU 130 may read strided data from different locations of the storage unit 140 at the same time. A stride may be a distance separating elements in the storage unit 140 that will be adjacent in a vector register. The storage unit 140 may keep data such as sampled analog data (from different antennas) in different locations.

The following describes how does data is loaded from the storage unit 140 via the DSU 130 to the compute engine 110. The DSU 130 may be an additional load path to provide streaming data from the storage unit 140 to the CE 110. In some embodiments the streaming data may be provided via holding queue registers 135 (FIG. 2A) in the DSU 130. These registers 135 may be conceptually queues next to DSU data storage unit 139 (discussed further down).

The DSU 130 may store the strided data in the DSU storage 139 which may be a temporary storage. The DSU 130 may read data block Blk0 from the storage unit 140 at address location Blk0, data block Blk1 from the storage unit 140 at address location Blk1, data block Blk2 from the storage unit 140 at the address location Blk2, and data block BlkN from the storage unit 140 at the address location BlkN. The data blocks Blk0, Blk1, Blk2, . . . , and BlkN. The strided data may be located adjacent to each other in the DSU storage 139. The DSU 130 processes, rearranges and reformats the data of the data blocks Blk0, Blk1, Blk2, . . . , BlkN. For example, the data are muxed and demuxed to form data streams such as data streams DSU Data0, DSU Data1, DSU Data2, and DSU DataN. The data streams may eventually be arranged in a vector form. The vector form in the DSU 130 may be the same as the vector form used in the CE 110. The vector from may comprise a SMID vector form to enable the SMID capabilities of the CE 110. The DSU 130 may write these data directly into the vector registers 115 of the CE 110. The CE 110 may not request the data from the DSU 130 but rather the DSU 130 writes the data automatically (without being requested or fetched) into the vector registers.

Figure 2A:
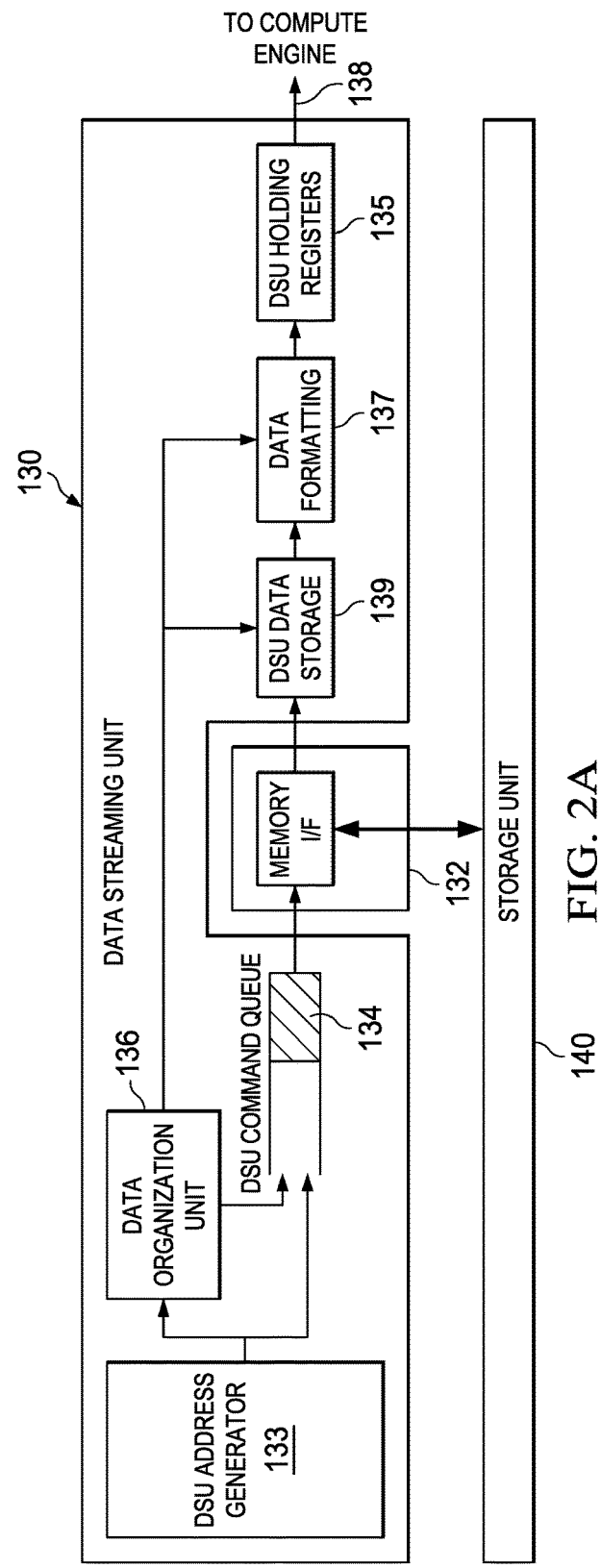
FIG. 2A shows a data steaming unit according to an embodiment.

FIG. 2A shows a detail of the DSU 130. FIG. 2A shows the DSU 130 and the storage unit 140. The DSU 130 comprises an address/data interface (port, input interface or memory interface) 132 and an output interface (port, output interface or CE interface) 138. The address/data interface 132 may be connected to a bus that connects the DSU 130 with the storage unit 140. The bus may comprise a data bus and an address bus. The bus may be a standard bus or a proprietary bus. The output interface 138 of the DSU 130 may be connected to the CE 110 via another bus.

The DSU 130 further comprises an address generator 133, a data organization unit 136 (e.g., data storage allocation and tracking unit) and a DSU data storage unit 139 (e.g., temporal storage unit). The address generator 133 is communicatively connected to the interface 132 (via the command queue 134) and to the data organization unit 136. The data organization unit 136 is communicatively connected to the interface 132 (via the command queue 134) and the DSU data storage 139. In turn, the DSU data storage 139 is communicatively connected to the interface 132 and the data formatting unit 137, the data formatting unit 137 is communicatively connected to the DSU holding registers 135 which is turn are communicatively connected to the output port 138. The DSU 130 (in particular the address generator 133) and not the CE 110 is configured to perform address generation, address calculation and address management (based on instruction of the CE 110). The DSU 130 and not the CE 110 may be configured to perform data organization such as data rearrangement, data reorganization and vector arrangement.

The address generator 133 includes a dedicated multi-dimensional stream address generator in a single pointer mode or in multiple pointer modes. The address generator 133 may generate a new request per cycle (e.g., non-aligned request). The command queue 134 may hold the command unit the data organization unit 136 modifies, cancels, or releases the commands. The commands are sent via the interface 132 to the storage unit 140.

The data organization unit 136 manages the DSU's internal data storage 139, tracks the lifetime of each piece of data and discovers any data reuse. The internal data storage 139 may be a content addressable memory (CAM). The CAM may be organized as CAM-tag compare slots. Each slot may be uniquely identified by its tag address. The data storage 139 may comprise an array of slots. For example, it may maintain the following metadata to track the contents and lifetime of the data in each slot.

TABLE 1

DSU Data storage metadata

| | |
|---|---|
| Tag Address | 32-bit physical address |
| Valid | Single bit indicating whether the tag address is valid |
| Ready | Single bit indicating that data has arrived for this address |
| Active | Single bit indicating whether there are any outstanding references to this data |

TABLE 2

Valid, Ready, and Active State bits

| Valid | Ready | Interpretation | Available for allocation |
|---|---|---|---|
| 0 | X | Address is Invalid | Yes |
| 1 | 0 | Request sent for slot; data inflight | No |
| 1 | 1 | Data available/landed | No |

The above metadata may help the data storage unit 139 to identify data reuse opportunities in the data stream.

Figure 2B:
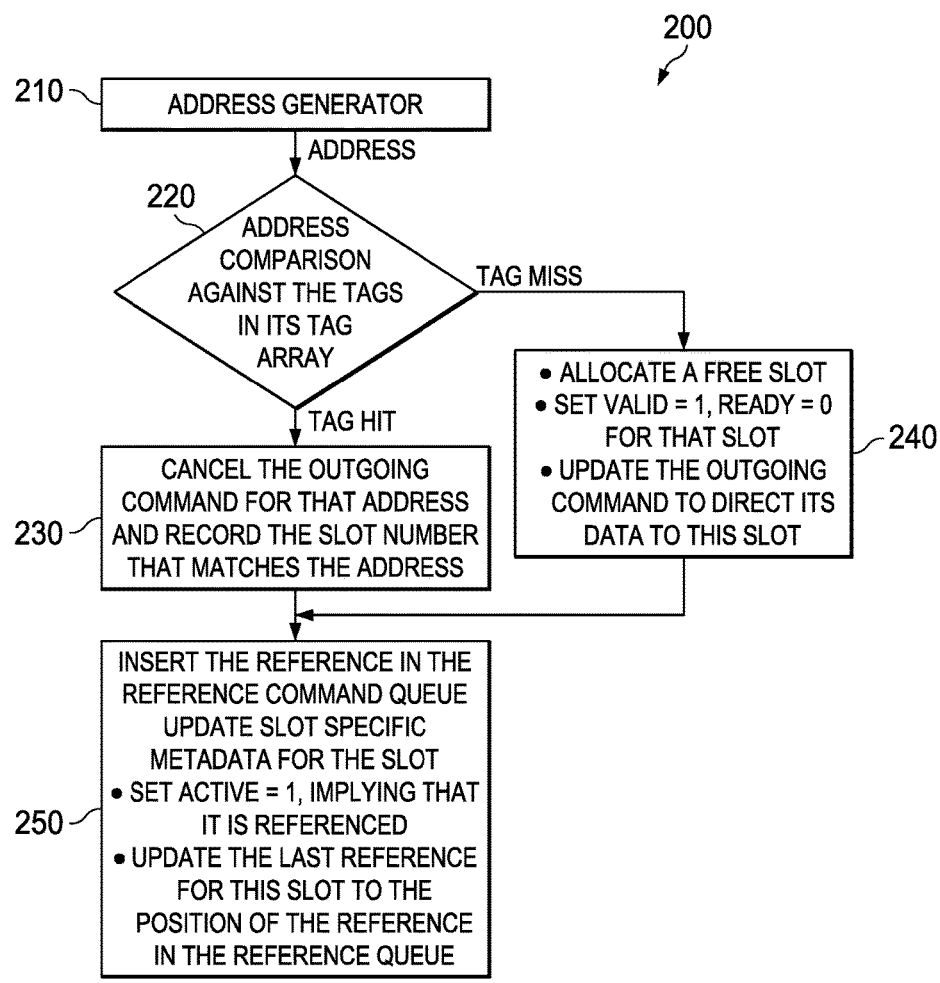
FIG. 2B shows a flow chart of a CAM-Tag look-up according to an embodiment.

FIG. 2B shows a flow chart of a CAM-Tag look-up method 200 according to an embodiment. In a first step 210, the address generator 133 (based on instruction of the CE 110) generates an address request to the data organization unit 136 and a command queue 134. The data organization unit 136 compares the address request against all tags in the tag array of the DSU data storage 139 at step 220. When the address request is matched (tag hit), the address organization unit 136 cancels the outgoing command for the address (in the command queue 134) and records the slot number in the DSU data storage unit 139 that matches the address request, step 230. When the address is not matched (tag miss), the data organization unit 136 allocates a free slot (e.g., by setting the slot valid=1 and ready=0) in the DSU data storage unit 139 at 240. The outgoing address command is not cancelled from the command queue but is updated to include the allocated slot. The command directs the requested data from the storage unit 140 to the allocated slot. The data organization unit 136 may updated the slot specific metadata for the slot (e.g., by setting the slot active=1, implying that it is referenced and updating the last reference for this slot to the position of the reference in the reference queue). The method 200 converts the generated addresses into slot numbers that represent the data along with commands that fetch the data.

In some embodiment the data organization unit 136 of the DSU 130 may allocate slots in the DSU data storage 139 in FIFO order by picking the slot one after the most recent allocation or picking the lowest number.

The DSU data storage unit 139 may store any number of elements. Heavy deep buffering may allow the DSU 130 to fetch far ahead in the data stream thereby hiding memory system latency.

The formatting unit 137 formats and organizes the data suitable for the algorithm of the CE 110. The formatting unit 137 may be a full butterfly network or a reduced CLOS network. For example, the data formatting unit 137 may organize the data into vector form (e.g., SMID vector) and may store them into the DSU holding registers 135. The data organization unit 136 may feed or write the data (e.g., data in vector form) into the vector registers of the CE 110. In other embodiments the CE 110 reads or fetches the data from the DSU holding registers 139. Some embodiments of these methods are described further below.

The DSU 130 may attempt to fetch data ahead of the CE's 110 demand for the data, so the DSU 130 can maintain full throughput. The DSU holding registers 135 may provide a small amount of elastic buffering so that the process remains fully pipelined. The size of DSU holding registers depends on the CE's 110 pipeline and how it is consuming data.

In some embodiments the wireless baseband system 110 includes a plurality of DSUs 130. In such a scenario, each DSU 130 may include the components described with respect to the DSU 130. Moreover, each DSU 130 may include an interface to the CE 110 and an interface to the storage unit 140.

The following paragraphs describe how the data is loaded from the DSU holding registers 135 to the vector registers of the CE 110. The DSU holding registers 135 may be holding queue registers. The DSU holding registers may provide data to compute engine via traditional read/write instructions to a queue such as POP/PUSH or any other equivalent method. In a first embodiment the holding queue registers are part of operand(s) of the CE's functional units. In a second embodiment the holding queue registers have special instructions to pop the data from the holding queue registers to the CE's VLIW registers (e.g., VLIW register files).

According to the first embodiment the DSU holding queue registers may be part of operands in vector functional units of the CE 110. All CE's candidate instructions may add additional operand fields to support reading data directly from the DSU holding queue registers 135. This may require changing the operand decoding fields and may increase the opcode size. In order reduce the additional complexity, a subset of CE's registers may be mapped to the DSU holding queue registers 135.

According to this embodiment a special field in C intrinsic code may be created that can translate into an indication that implies whether this read will pop the element or not form this holding queue registers. A "++" may be used to imply implicit pop from the queue registers otherwise the value stays the same as shown below:

With "++" following C intrinsic
elemY=MUL(DSU0++, DSU1++);
translates to
MUL DST_VReg, DSU0_POP_Vreg, DSU1_POP_VReg
Without "++" following C intrinsic
elemY=MUL(DSU0, DSU1);
translates to
MUL DST_VReg, DSU0_Vreg, DSU1_VReg.

In the second embodiment special instructions may be created to pop the data from DSU holding registers 135 to vector register files in the CE 110. According to this embodiment two special instructions may be created to be executed on CE's functional unit. The two instructions include to pop the data from DSU holding queue registers 135 and to move them into the internal register files. In some embodiments the existing message queue pop instructions may be used to achieve this functionality.

The canonical form of POPDSU may take the following arguments:
POPDSU.xxx Vr, DSU0 (For DSU0)
POPDSU.xxx Vr. DSU1 (For DSU1)

| Argument | Description |
| --- | --- |
| DSUx | DSU Holding queue register id DSU_Vreg in AGL DSU_Vreg in AGS |
| Vr | Vector register file | wherein the POPDSU instruction specifications in Compute Engine format are as follows:
Operands

| Name | Size | Direction | Description | Num of Encoding |
| --- | --- | --- | --- | --- |
| Vr | 128-bit | Output | 128-bit Data | 4 |
| DSUx | 32-bit | Input | 32-bit identifier for DSU0 message queue | ??? |

Assembler Syntax
POPDSU Vr, DSU0_Vreg (For DSU0)
Description
POPDSU instruction reads a 128-bit data from DSU0's message queue. The read data is written to a Vr register. If the DSU message queue is empty the processor stalls.

Below are examples for the first and second embodiments.

```
void Matrix_Mul4_MJ( T_Matrix* __restrict pY, T_Matrix*
    __restrict pA, T_Matrix* __restrict pB )
{
    complex_4x16* __restrict pDataY_Orig = pY->pData;
    const complex_4x16* __restrict pDataA_Orig = pA->pData;
    const complex_4x16* __restrict pDataB_Orig = pB->pData;
    size_t nRows = pY->rowCount;
    size_t nCols = pY->colCount;
    size_t nWords = pY->wordCount;
    size_t r, c, w;
    complex_4xW elemA0, elemB0;
    complex_4xW elemA1, elemB1;
    complex_4xW elemA2, elemB2;
    complex_4xW elemA3, elemB3;
    complex_4xW elemY;
    const complex_4x16* __restrict pDataA;
    const complex_4x16* __restrict pDataB;
    complex_4x16* __restrict pDataY;
    for( r = 0; r < nRows; r++ )
    {
        for( c = 0; c < nCols; c++ )
        {
            pDataA = pDataA_Orig + nWords * 4 * r;
            pDataB = pDataB_Orig + nWords * c;
            pDataY = pDataY_Orig + nWords * (nCols * r + c);
            for( w = 0; w < nWords; w++ )
            {
                elemA0 = pDataA[          w];
                elemA1 = pDataA[  nWords + w];
                elemA2 = pDataA[2 * nWords + w];
                elemA3 = pDataA[3 * nWords + w];
                elemB0 = pDataB[          w];
                elemB1 = pDataB[  nWords * nCols + w];
                elemB2 = pDataB[2 * nWords * nCols + w];
                elemB3 = pDataB[3 * nWords * nCols + w];
                elemY = VMUL( elemA0, elemB0 );
                VMULA( elemY, elemA1, elemB1 );
                VMULA( elemY, elemA2, elemB2 );
                VMULA( elemY, elemA3, elemB3 );
                pDataY[w] = elemY;
```

```
      }
     }
    }
   }
``` with the following code after pointer manipulation offloaded to DSU.

For the first embodiment (updated matrix multiple kernel):

```
DSU_OPEN(0, &pDataA[0], DSU_CFG0, SINGLE_PTR_MODE);
DSU_OPEN(1, &pDataB[0], DSU_CFG1, SINGLE_PTR_MODE);
for( r = 0; r < nRows; r++ )
{
  for( c = 0; c < nCols; c++ )
  {
    pDataY = pDataY_Orig + nWords * (nCols * r + c);
    //Proposal 1
    for( w = 0; w < nWords; w++ )
    {
      elemY = VMUL( DSU0++, DSU1++ );
      VMULA( elemY, DSU0++, DSU1++ );
      VMULA( elemY, DSU0++, DSU1++ );
      VMULA( elemY, DSU0++, DSU1++ );
      pDataY[w] = elemY;
    }
  }
}
```

For the second embodiment (updated matrix multiple kernel):

```
DSU_OPEN(0, &pDataA[0], DSU_CFG0, SINGLE_PTR_MODE);
DSU_OPEN(1, &pDataB[0], DSU_CFG1, SINGLE_PTR_MODE);
for( r = 0; r < nRows; r++ )
{
  for( c = 0; c < nCols; c++ )
  {
    pDataY = pDataY_Orig + nWords * (nCols * r + c);
    //Proposal 2
    for( w = 0; w < nWords; w++ )
    {
      POPDSU( elemA0, DSU0);
      POPDSU( elemB0, DSU1);
      elemY = VMUL( elemA0, elemB0 );
      POPDSU( elemA1, DSU0);
      POPDSU( elemB1, DSU1);
      VMULA( elemY, elemA1, elemB1 );
      POPDSU( elemA2, DSU0);
      POPDSU( elemB2, DSU1);
      VMULA( elemY, elemA2, elemB2 );
      POPDSU( elemA3, DSU0);
      POPDSU( elemB3, DSU1);
      VMULA( elemY, elemA3, elemB3 );
      pDataY[w] = elemY;
    }
  }
}
```

Figure 3:
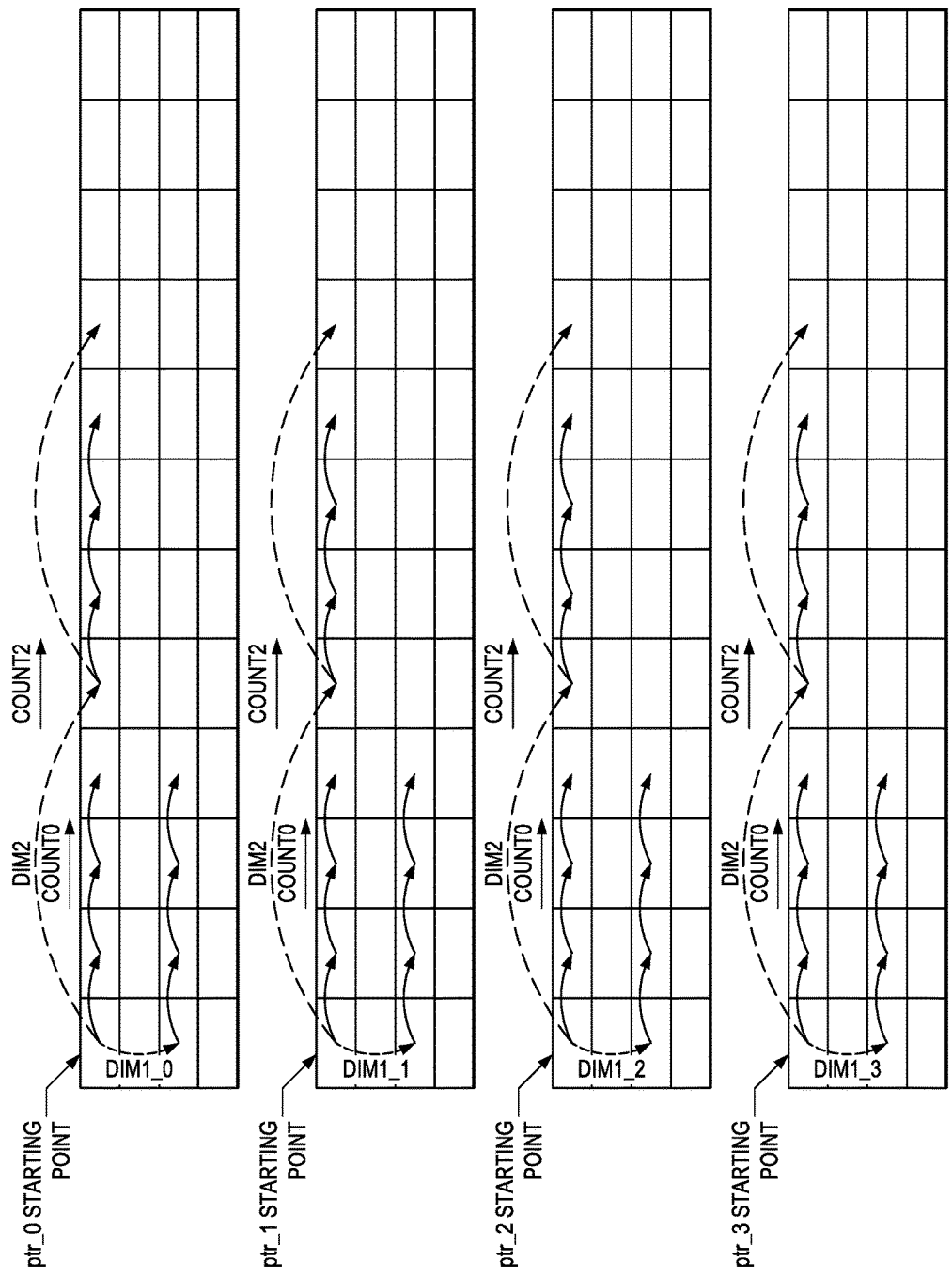
FIG. 3 shows a high level address generation logic according to an embodiment.

FIG. 3 shows an embodiment algorithm of how the address generator 133 (together with the data organization unit 136) accesses data in the storage unit 140. For example, FIG. 3 shows streaming access to four different base address locations. The DSU 130 may access the storage unit 140 with more or less than four address locations at the same time. The access pattern for these four different locations may be different, e.g., may use different parameters (e.g., dimension may be such a parameter). For example, in a streaming access the first access location may be accessed with a base address location ptr_0, a count COUNT0 or COUNT2 and a dimension dim1_0, the second access location may be accessed with a base address location ptr_1, a count COUNT0 or COUNT 2 and a dimension dim1_1, the third access location may be accessed with a base address location ptr_2, a count COUNT0 or COUNT 2 and a dimension dim1_2, and the fourth access location may be accessed with a base address location ptr_3, a count COUNT0 or COUNT 2 and a dimension dim1_3. In other embodiments, however, the streaming access pattern may be the same for two different address locations or for all access locations.

Figure 4:
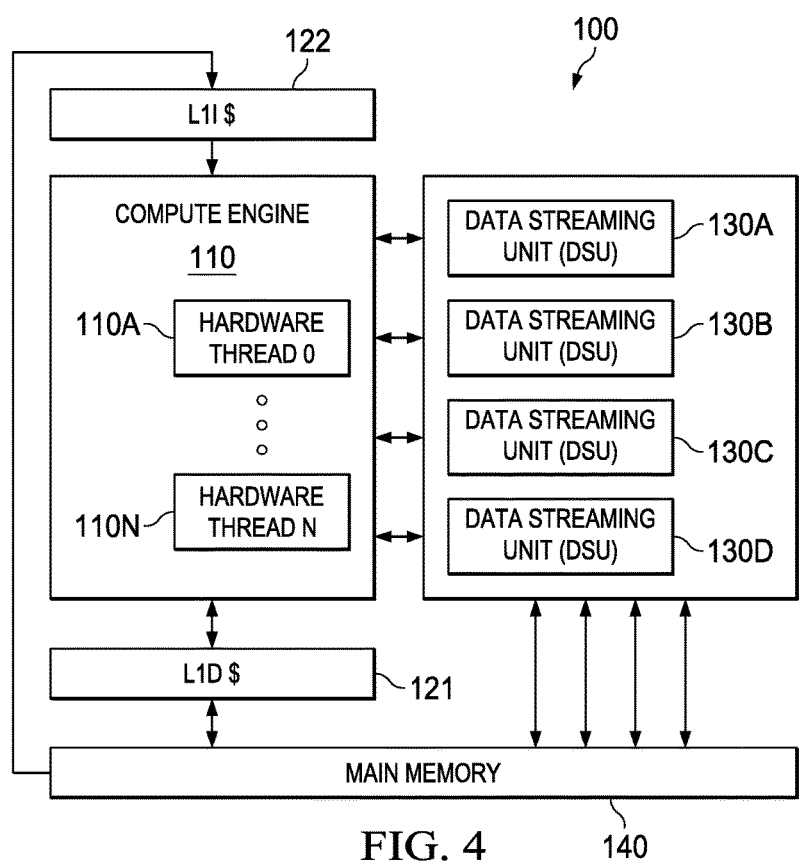
FIG. 4 shows a multi-threaded compute engine with a plurality of data streaming units according to an embodiment.

FIG. 4 shows an embodiment of a wireless baseband unit with a CE 110 communicatively connected to a plurality of DSUs 130. The CE 110 may comprise a plurality of hardware threads 110A-110N. The hardware threads 110A-110N may be independent hardware threads. The CE 110 may be communicatively connected to an instruction cache 122 which in turn is communicatively connected to the storage unit 140. The CE 110 may also be communicatively connected to the data cache 121 which in turn is communicatively connected to the storage unit 140. The plurality of data streaming units 130A-130D may each be communicatively connected to the storage unit 140. Each of the data streaming unit 130A-130D may be communicatively connected to a hardware thread 110A-110N. Each data streaming unit 130A-130D may be assigned to one of the hardware threads 110A-110N. In some embodiments there are the same numbers of data streaming units 130A-130D as there are hardware threads 110A-110N. In other embodiments there are more or less data streaming units 130A-130D than there are hardware threads 110A-110N. Each data streaming unit 130A-130D may perform the functions described in the previous embodiments and each thread 110A-110N may perform the CE functions described in previous embodiments.

Figure 5A:
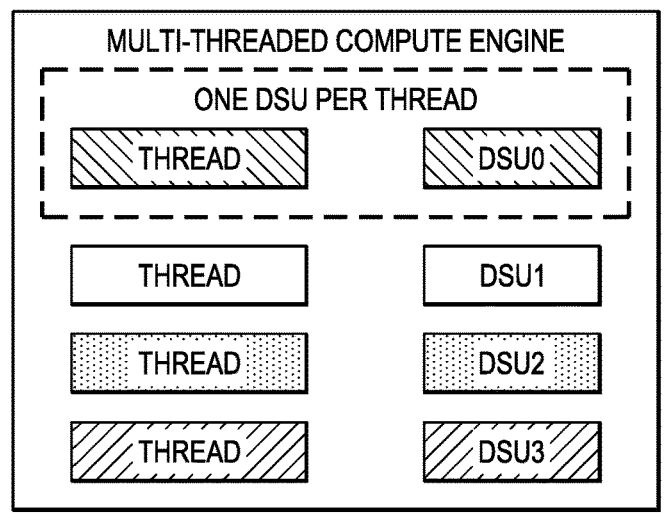
FIGS. 5A and 5B show a multi-threaded compute engine wherein the threads use different numbers of data streaming units according to an embodiment.

In the embodiment of FIG. 5A the embodiments shows the allocation of one data streaming unit 130A-130D to one hardware thread 110A-110D. Accordingly, here are a finite number of data streaming units 130A-130D allocated to a finite number of hardware threads 110A-110D in a one to one relationship.

Figure 5B:
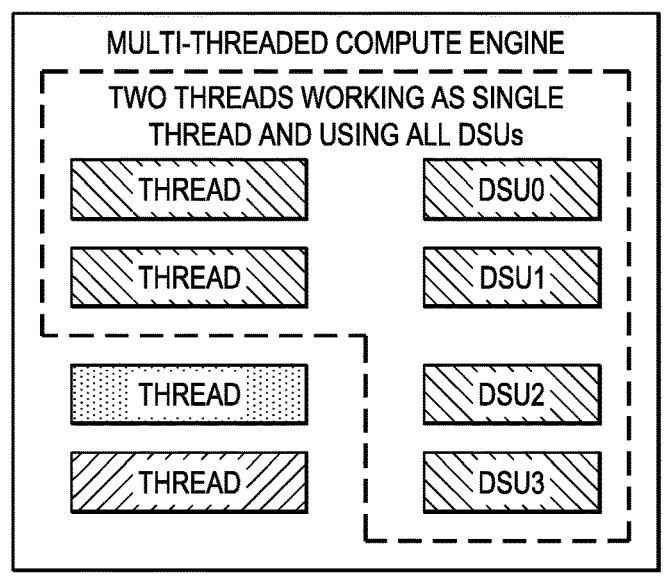

In the embodiment of FIG. 5B the embodiment shows the allocation of several or all data streaming units 130A-130D to a subset of hardware thread 110A-110D. All hardware threads 110A-110D may be allocated to less than the maximum number of hardware threads 110A-110D. For example, four data streaming units 130A-130D may be allocated to two hardware threads 110A-110B. The two hardware threads 110A and 110B may operate as one hardware thread. The two remaining hardware threads 130C and 130D may operate in a traditional way via NUMA architecture and without an allocation of data streaming units 130A-130D.

Figure 6:
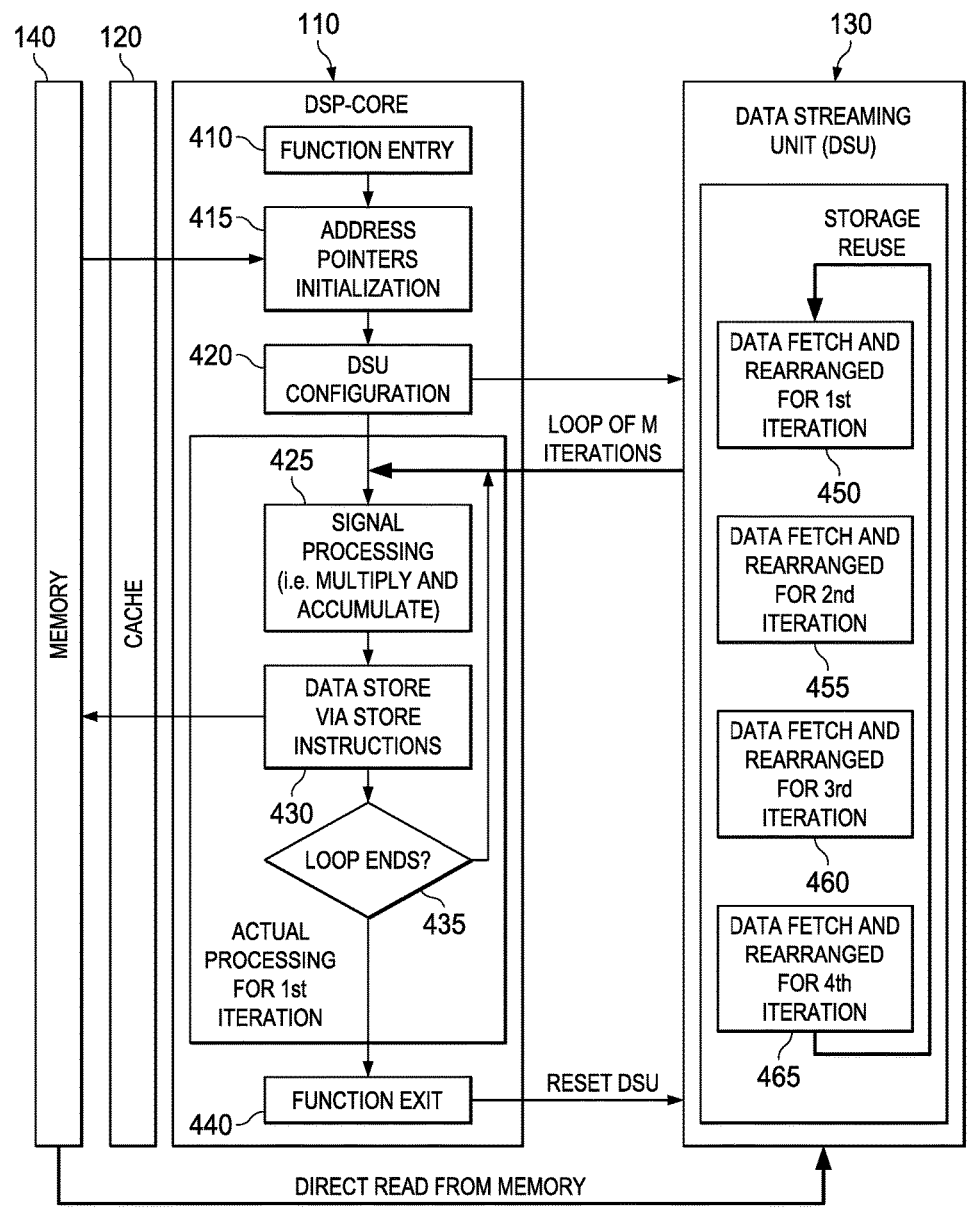
FIG. 6 shows an algorithm of the wireless baseband unit according to an embodiment.

FIG. 6 shows a flow chart for a CE 110 operation and a DSU 130 operation. The process flow of the CE 110 may comprise the steps 410-440. In step 410 a function entry is provided to the CE 110. In step 415 the address pointers are initialized and provided. The address pointers may be provided by providing data from the cache 120 and storage unit 140 to the CE 110. In the next step 420, the DSU 130 is configured. The DSU may be configured by providing data from the cache 120 and the storage unit 140 to the CE 110 and the DSU 130.

After the address pointers are initialized and the DSU 130 is configured the CE 110 may start processing signal data (such as baseband data from an antenna) or real time data. In step 425, the CE 110 executes a first instruction set (multiplying and accumulating) and performs data processing. The data are provided via step 450 of the DSU 130. The data may be fetched via the DSU from the storage unit 140 and rearranged, e.g., in vector form. The received data may not be rearranged in vector form in the CE 110. The CE 110 may take the data as they are provided by the DSU 130 (e.g., written by the data organization unit 136 in the DSU holding registers 135 and the vector registers of the CE 110) and may directly perform signal processing on these data.

After processing the data the processed data may be stored in the data cache 120 and/or the storage unit 140 in step 430. The processed data may be written in the data cache 120 and/or the storage unit 140 by the CE 110 via store instructions 430 (alternatively via DSU 130 as explained with respect to FIG. 1b). The process moves then to decision block 435. Block 435 determines whether the loop ends. If the loop does not end, the process moves back to signal processing step 425 where further data is received via the second iteration step 455 by the DSU 130 and processed in a second iteration step. In the second step 455 the DSU 130 fetches and rearranges further data again for the second iteration of the CE 110 directly from the storage unit 140. After executing the first instruction set in a second iteration second processed data may be stored in the data cache 120 and/or storage unit 140 via a store instruction in step 430. After this step 430 the process again advances to the decision step 435. The process 425-435 may be iterated M times with data each time fetched, rearranged and delivered by the DSU 130 to the CE 110 (e.g., in steps 450-465). When the loop ends the decision block 435 advances the process to step 440 where the CE 110 exits the function (or first instruction set). The loop may be the performance of a certain instruction set on many different data. The CE 110 may then enter a second function (second instruction set) and perform all the steps previously described on the second function, etc. In various embodiments the processed data are stored in or written to the storage unit 140 via the cache 120 and not via the DSU 130.

In some embodiment, the process flow of the DSU 130 may comprise the steps 450-465. In step 450 the data is directly fetched form the storage unit 140 by bypassing the data cache 120 for a first iteration. Before the data is provided to the CE 110 it may be rearranged from a first format to a second format. The second format may comprise a vector form. The second format may be most efficient for the CE 110. In step 455 the data is directly fetched from the storage unit 140 and rearranged (or reformatted) for the second iteration. Before the data is provided to the CE 110 it may be rearranged from a first format to a second format. The second format may comprise a vector form. The DSU 130 repeats these actions in steps 460 and 465 for a third and a fourth iteration, or alternatively, for up to an Mth iteration.

In some embodiments, the DSU 130 may reuse data which it has previously requested and fetched from the storage unit 140. The fetched data may be stored temporarily within the DSU 130. Some or all of this data may be reused by a later iteration. This has the advantage of faster data access and reduces the number of requests to the storage unit 140.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A data streaming unit (DSU) comprising:
    a memory interface configured to be connected to a main memory without a cache in between;
    a compute engine interface configured to be connected to a compute engine;
    an address generator configured to manage address data representing address locations in the main memory; and
    a data organization processor configured to access data in the main memory and to reorganize the data to be forwarded to the compute engine,
    wherein the memory interface is communicatively connected to the address generator and the data organization processor,
    wherein the address generator is communicatively connected to the data organization processor,
    wherein the data organization processor is communicatively connected to the compute engine interface.

2. The data streaming unit according to claim 1, wherein the data organization processor is configured to reorganize the data into a vector form.

3. The data streaming unit according to claim 2, wherein the vector form comprises a single instruction multiple data (SIMD) vector form.

4. The data streaming unit according to claim 1, further comprising DSU holding registers configured to temporarily store the reorganized data.

5. The data streaming unit according to claim 4, wherein the DSU holding registers are configured to be mapped to compute engine registers located in the compute engine.

6. The data streaming unit according to claim 4, wherein the DSU holding registers are configured to receive POP/PUSH instruction messages from the compute engine.

7. The data streaming unit according to claim 1, wherein the data organization processor is configured to access streaming data.

8. The data streaming unit according to claim 1, further comprising a DSU data storage unit, the DSU data storage unit being communicatively connected to the memory interface, the data organization processor and the compute engine interface.

9. The data streaming unit according to claim 8, wherein the DSU data storage unit is a content addressable memory (CAM)-tag memory.

10. The data streaming unit according to claim 8, further comprising a data formatting unit, the data formatting unit communicatively connected to the DSU data storage unit, the data organization processor and DSU holding registers which in turn are communicatively connected to the compute engine interface.

11. The data streaming unit according to claim 10, wherein the data formatting unit comprises a butterfly network or a CLOS network.

12. A system comprising:
    a compute engine configured to process baseband data;
    a main memory configured to store the baseband data;
    an instruction cache communicatively connected to the compute engine and the main memory; and
    a data streaming unit (DSU) connected to the main memory without a cache in between and configured to provide the baseband data from the main memory to the compute engine by bypassing the instruction cache, wherein the data streaming unit is configured to process real time data while the instruction cache is configured to process control data.

13. The system according to claim 12, wherein the data streaming unit comprises an address generator and a data organization processor, wherein the address generator is configured to manage address data representing address locations in the main memory, and wherein the data organization processor is configured to access data from the main memory and to reorganize the data into a vector form in order to be provided to the compute engine.

14. The system according to claim 12, wherein the data streaming unit comprises DSU holding registers, wherein the compute engine comprises vector registers, and wherein the compute engine is configured to map the data from the DSU holding registers to the vector registers of the compute engine to the DSU holding registers.

15. The system according to claim 12, wherein the compute engine comprises a plurality of hardware threads, wherein the data streaming unit comprises a plurality of data streaming units, and wherein the data streaming units are allocated to the hardware threads.

16. The system according to claim 15, wherein a single data streaming unit is allocated to a single hardware thread.

17. The system according to claim 15, wherein a subset of the plurality of hardware threads are allocated to the plurality of data streaming units.

18. The system according to claim 12, wherein the data streaming unit is configured to write data from the compute engine to the main memory, and wherein the data are real time data.

19. The data streaming unit according to claim 1, wherein the data streaming unit is configured to write data from the compute engine to the main memory.

20. A data streaming unit (DSU) comprising:
a memory interface configured to be directly connected to a main memory;
a compute engine interface configured to be connected to a compute engine;
an address generator configured to manage address data representing address locations in the main memory; and
a data organization processor configured to access data in the main memory and to reorganize the data to be forwarded to the compute engine,
wherein the memory interface is communicatively connected to the address generator and the data organization processor,
wherein the address generator is communicatively connected to the data organization processor,
wherein the data organization processor is communicatively connected to the compute engine interface.

21. The data streaming unit according to claim 20, further comprising a DSU data storage unit communicatively connected to the memory interface, the data organization processor and the compute engine interface, wherein the DSU data storage unit is a content addressable memory (CAM)-tag memory.

* * * * *